United States Patent Office 3,748,336
Patented July 24, 1973

3,748,336
PROCESS FOR THE PRODUCTION OF PYRIDINE CARBOXYLIC ACIDS
August Stocker, Othmar Marti, Theodul Pfammatter, and Gerhart Schreiner, Visp, Switzerland, assignors to Lonza Ltd. A.G., Basel, Switzerland
No Drawing. Continuation-in-part of application Ser. No. 871,951, Oct. 28, 1971, now Patent No. 3,657,259, dated Apr. 18, 1972. This application July 19, 1971, Ser. No. 164,002
The portion of the term of the patent subsequent to Apr. 18, 1989, has been disclaimed
Int. Cl. C07d 31/36
U.S. Cl. 260—295 R
22 Claims

ABSTRACT OF THE DISCLOSURE

Nicotinic acid and other carboxylic acids having a pyridine nucleus may be prepared by the oxidation of fused-ring pyridine compounds in the presence of 25 to 600 percent excess nitric acid at temperatures of 180° to 370° C. with pressures of 20 to 500 atm. The nitric acid concentration of the reaction mixture is adjusted to 10 to 28 percent to precipitate as crystalline hydronitrate and separated from the mixture. The pH of an aqueous solution of the pyridine carboxylic acid hydronitrate is adjusted with the basic starting material to the isoelectric point of the specific pyridine carboxylic acid to precipitate the same. The crystalline precipitation is separated and the mother liquors are combined and recycled as the starting material after adjustment of the concentrations therein.

---

This application is a continuation-in-part application of copending application Ser. No. 871,951, filed on Oct. 28, 1971, which issued as U.S. Pat. No. 3,657,259 on Apr. 18, 1972.

BACKGROUND OF THE INVENTION

(1) Field of the invention

The invention relates to a process for the production of carboxylic acids containing a pyridine nucleus through oxidation of the fused-ring pyridine compound with nitric acid at elevated temperatures and elevated pressures.

(2) Prior art

Pyridine carboxylic acids have been produced by the oxidation of alkyl pyridines with nitric acid. In practicing this process, one generally proceeds in such a manner that the solution, containing the pyridine carboxylic acid, emerges from the reactor with a pH value which corresponds precisely to the isoelectric point of the pyridine carboxylic acid. Then the pyridine carboxylic acid is crystallized out and separated. However, the disadvantage of this method of operation lies in the fact, that the pyridine carboxylic acid product is impure and the mother liquor still contains large quantities of pyridine bases and pyridine carboxylic acid. Working up of this mother liquor is very expensive and has been found commercially unsatisfactory. For example, nicotinic acid is produced by this prior art process through oxidation of 2-methyl-5-ethyl pyridine. The starting mixture usually contains 5 to 6 moles of the pyridine compound that is converted at 190° to 220° C. and 35 atmospheres to isocinchomeronic acid which is decarboxylized to nicotinic acid at 220° C. These reactions require about 40 to 45 minutes. The solution leaving the reactor has a pH value of 3.4 and nicotinic acid is crystallized from this solution as a bright yellow product. The starting material reacted is approximately 80 percent and the yield is about 70 percent of the reacted starting material. The resulting mother liquor must be concentrated in order to further recover nicotinic acid therefrom and the unreacted starting material is isolated from the remaining filtrate.

DESCRIPTION OF THE INVENTION

The present invention eliminates the disadvantages of the prior art processes.

According to the present invention, 25 to 600 percent excess nitric acid is used above the quanity required in theory for oxidation of the fused-ring pyridine compounds. The mixture is subjected to temperatures of 180° to 370° C., preferably 230° to 350° C., and to pressures of 20 to 500 atm., preferably 50 to 300 atm., for a reaction time of 2 seconds to 30 minutes. The resulting reaction mixture is adjusted to have a nitric acid concentration of 10 to 28 percent, the pyridine carboxylic acid is crystallized out at a temperature of 0° to 20° C. as a hydronitrate and separated from the acid mother liquor. The crystallized pyridine carboxylic acid hydronitrate is then dissolved in water, the pH of the solution is adjusted with the basic starting material to the isoelectric point of the pyridine carboxylic acid product and the pyridine carboxylic acid is separated by crystallization. The base-containing mother liquor and the reaction-mixture mother liquor are combined, fortified to adjust concentrations and recycled as the starting mixture.

The use of an excess of $HNO_3$ which is preferably 30 to 400 percent above the quantity theoretically required for the oxidation, promotes the formation of the hydronitrate of the pyridine carboxylic acid.

While the reaction time can vary between 2 seconds and 30 minutes, a reaction time of 8 to 14 minutes generally provides a favorable balance of a high conversion percentage against decomposition of the pyridine carboxylic acid product within the preferred ranges. One skilled in the art can determine the optimum reaction time without difficulty because the time will be within the above stated range.

The nitric acid concentration of the reaction mixture containing the hydronitrate is adjusted to the point of minimum solubility to obtain a maximum separation of the hydronitrate. It is particularly advantageous to precipitate the hydronitrate at 4° to 12° C. from a reaction mixture having a nitric acid concentration of 12 to 25 percent by weight based on the reaction solution.

The precipitate of hydronitrate is dissolved in a small amount of water and the pyridine carboxylic acid is formed by the addition of supplemental pyridine compounds. During this addition, pyridine carboxylic acid is precipitated. The quantity of pyridine compound which is added varies with the isoelectric point of the particular pyridine carboxylic acid to be precipitated. To improve the product purity, it is advantageous to briefly heat the precipitated pyridine carboxylic acid to redissolve the acid and then to cool the solution to obtain a second precipitation. The pyridine carboxylic acid thus obtained from the base containing mother liquor is a substantially pure product.

Since the pyridine carboxylic acid was formed from the fused-ring pyridine compound, the mother liquor obtained after separation of the acid product will contain large quantities of this starting material. This mother liquor is combined with the mother liquor resulting from the separation of the hydronitrates; the concentrations are adjusted by the addition of starting material and nitric acid; and the mother liquor is then recycled.

One advantage of the process of the invention is that many diverse carboxylic acids having a pyridine nucleus can be produced. For example, nicotinic acid, dinicotinic acid, carbisocinchomeronic acid, carbodinicotinic acid and 2,3,5,6-pyridinetetracarboxylic acid may be prepared from fused-ring compounds having a pyridine core. The fused-ring pyridine compounds of this invention are compounds containing a heterocyclic six-member ring (pyridine core)

fused to a benzene ring. The heterocyclic ring contains one nitrogen atom other than carbon as a member of the ring structure. The benzene ring(s) and the heterocyclic six-member ring can have substituents such as alkyl groups, amino groups, hydroxyl groups and mixtures thereof. The alkyl substituents may contain 1 to 20 carbon atoms, and alkyl groups having 1 to 4 carbon atoms are preferred.

Examples of useful fused-ring pyridine compounds are:

quinoline;
quinaldine (2-methylquinoline);
3-methylquinoline;
lepidine (4-methylquinoline);
5-methylquinoline;
6-methylquinoline;
7-methylquinoline;
8-methylquinoline;
2-aminoquinoline;
4-aminoquinoline;
5-aminoquinoline;
6-aminoquinoline;
7-aminoquinoline;
8-aminoquinoline;
2-amino-4-hydroxyquinoline;
2,3-dimethylquinoline;
5-amino-6-hydroxyquinoline;
2,4-dimethylquinoline;
5-amino-8-hydroxyquinoline;
2,6-dimethylquinoline;
7-amino-8-hydroxyquinoline;
2,8-dimethylquinoline;
2-amino-4-methylquinoline;
3,4-dimethylquinoline;
3-amino-2-methylquinoline;
5,8-dimethylquinoline;
4-amino-2-methylquinoline;
6,8-dimethylquinoline;
5-amino-2-methylquinoline;
3-hydroxyquinoline;
5-amino-8-methylquinoline;
4-hydroxyquinoline;
6-amino-2-methylquinoline;
5-hydroxyquinoline;
6-amino-4-methylquinoline;
6-hydroxyquinoline;
7-amino-2-methylquinoline;
7-amino-8-methylquinoline;
8-amino-2-methylquinoline;
8-amino-6-methylquinoline;
2-hydroxyquinoline (2-quinolinol or carbostyril);
8-hydroxyquinoline (8-quinolinol);
3-ethyl-2-hydroxyquinoline;
2,3,4-trimethylquinoline;
2,4,5-trimethylquinoline;
2,4,7-trimethylquinoline;
2,4,6-trimethylquinoline;
2,3-dimethyl-4-hydroxyquinoline;
2,4-dimethyl-6-hydroxyquinoline;
2,4-dimethyl-7-hydroxyquinoline;
2,4-dimethyl-8-hydroxyquinoline;
2,6-dimethyl-4-hydroxyquinoline;
2,8-dimethyl-4-hydroxyquinoline;
4,6-dimethyl-2-hydroxyquinoline;
4,7-dimethyl-2-hydroxyquinoline;
4,8-dimethyl-2-hydroxyquinoline;
6,8-dimethyl-2-hydroxyquinoline;
6,8-dimethyl-5-hydroxyquinoline;
3-hydroxy-3-methylquinoline;
2-hydroxy-4-methylquinoline;
2-hydroxy-6-methylquinoline;
3-hydroxy-2-methylquinoline;
4-hydroxy-2-methylquinoline;
5-hydroxy-2-methylquinoline;
5-hydroxy-6-methylquinoline;
5-hydroxy-8-methylquinoline;
6-hydroxy-2-methylquinoline;
6-hydroxy-4-methylquinoline;
6-hydroxy-8-methylquinoline;
7-hydroxy-6-methylquinoline;
8-hydroxy-2-methylquinoline;
8-hydroxy-4-methylquinoline;
8-hydroxy-5-methylquinoline;
8-hydroxy-6-methylquinoline;
8-hydroxy-7-methylquinoline;
2,4,8-trimethylquinoline;
2,5,6-trimethylquinoline;
2,6,7-trimethylquinoline;
2,5,7-trimethylquinoline;
2,6,8-trimethylquinoline;
4,5,8-trimethylquinoline;
other similar quinoline derivatives;
isoquinoline (3,4-benzopyridine);
1-aminoisoquinoline;
1-hydroxyisoquinoline;
5-aminoisoquinoline;
1-methylisoquinoline;
2-methylquinoline;
3-methylquinoline;
4-methylquinoline;
6-methylquinoline;
7-methylquinoline;
8-methylquinoline;
other similar methyl-, hydroxy- and amino-isoquinoline derivatives;
acridine (2,3:5,6-dibenzopyridine);
2-aminoacridine;
3,6-diaminoacridine;
3-aminoacridine;
2-methylacridine;
4-aminoacridine;
9-aminoacridine;
other similar methyl-, amino- and hydroxy-acridines;
phenanthridine (2,3:4,5-dibenzopyridine);
9-hydroxyphenanthridine; and
other similar amino-, hydroxy- and methyl acridines.

The various useful fused-ring pyridine compounds can be prepared by methods known to those ordinarily skilled in the art. Methods of preparing certain of the compounds are given below. Quinoline and isoquinoline are available from coal tar. 2-methylquinoline can be prepared by the Doebner-Miller synthesis. Aromatic amines can be reacted with 1,3-diketones to produce 2,4-dialkyl quinolines. 8-hydroxyquinoline is prepared from o-aminophenol by the Skraup reaction. 2-hydroxyquinoline can be obtained by the reduction of o-nitrocinnamic acid to the amino acid which spontaneously cyclizes to the amide, which is tautomeric with 2-hydroxyquinoline. 3,6-diaminoacridine is prepared by reacting formaldehyde and metaphenylene diamine in the presence of $ZnCl_2$.

Our copending application Ser. No. 871,951, filed on Oct. 28, 1969, further disclosed that non-fused ring pyridines containing alkyl groups (having 1 to 20 carbon atoms) could be treated by the method of this invention to produce carboxylic acid derivatives of pyridine. For example, nicotinic acid, isonicotinic acid, picolinic acid, isocinchomeronic acid and cinchomeronic acid can be prepared from alkyl pyridines, such as, methyl-ethyl pyridine, picoline, collidine, lutidine, ethyl pyridine and dimethyl pyridine.

The use of 30 to 400 percent excess nitric acid over the theoretical quantity is preferred.

Oxidation by this process results in conversions of 95 to 99 percent with a substantially pure product yield of up to 99.8 percent. Because of the excellent product purity, further purification before use of the product is unnecessary.

Reaction vessels made of titanium are preferred and, if the higher pressures of the disclosed range are used, titanium-lined steel pipe is satisfactory.

The temperature at which the oxidation is conducted may be selected to decarboxylate the acid formed. If the oxidation is conducted at temperatures above about 250° C., the corresponding acid is decarboxylated and is not isolated (but acids containing fewer carboxyl groups can be obtained). The following reactions demonstrate several examples of acids which may be prepared directly by oxidation, as well as oxidation-decarboxylation.

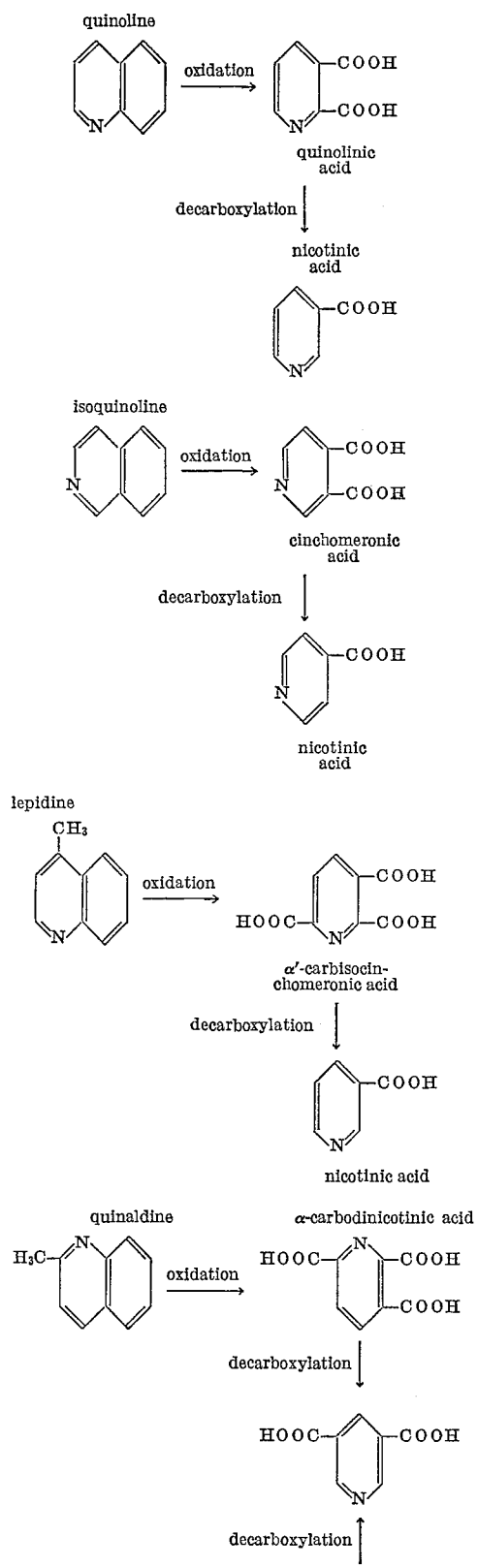

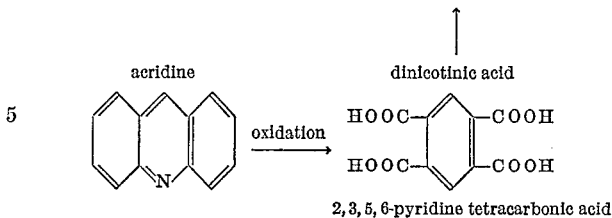

As used herein, all percentages and parts are on a weight basis unless otherwise noted or otherwise obvious to one ordinarily skilled in the art.

The following examples illustrate but do not limit this invention.

EXAMPLE 1

4500 gm. of a mixture of 8.0 percent quinoline with 32 percent nitric acid (corresponding to 50 percent excess of the theoretical quantity) with a residence time of 2.0 minutes were passed through a 1.6 liter titanium reactor pipe (length 16 m.) at a temperature of 260° C. and 55 atm. 4010 gm. of a liquid raw product resulted. The remainder, 490 gm., was released in the form of a gas. The liquid reaction product was adjusted to a nitric acid concentration of 25 percent and cooled to 0° C. to precipitate 380.0 gm. of nicotinic acid hydronitrate with a nicotinic acid content of 66.3 percent. This raw product was separated from the acid mother liquor (1020 gm.) by centrifuging and 46.0 gm. of nicotinic acid remained in the mother liquor.

The nicotinic acid hydronitrate (380 gm.) was dissolved in 1350 gm. of water and adjusted to a pH of 3.4 by quinoline at 95° C. After cooling to 7° C., the nicotinic acid precipitated and was centrifugally separated and dried. 210 gm. of nicotinic acid resulted with a conversion of 96 percent based on the quinoline corresponding an isolated yield of 63.9 percent.

The total yield, isolated nicotinic acid in the mother liquor, was 92.0 percent.

The acidic and the base containing mother liquors were combined and adjusted by quinoline and nitric acid to the starting concentration and quantity. This solution was recycled and processed under the condition described above to produce 283.0 gm. of nicotinic acid, corresponding to an isolated yield of 86 percent with quinoline conversion of 96 percent. The nicotinic acid was pure white and had a purity of 99.9 percent.

EXAMPLE 2

4632 gm. of a mixture of 6.3 percent 2-methyl-5-ethyl pyridine and 28.1 percent HNO₃ (corresponding to an excess of about 42 percent over theoretical) were passed through a 1.48 liter reactor tube made of V2A steel at a temperature of 239° C. and 55 atm. pressure. The retention time was 12.72 minutes and the conversion took 35 minutes. The liquid reaction product weighed 3966 gm. The remainder, 666 gm. (14.35 percent), was conducted off in a gaseous form. The liquid reaction product was concentrated by boiling until the nitric acid concentration was 25 percent and then it was cooled to 5° C. 354.2 gm. of nicotinic acid hydronitrate with a nicotinic acid content of 66.1 percent were crystallized out. This product was separated from the acid mother liquor (833 gm.) by centrifuging. An additional 30.8 gm. of nicotinic acid were contained in the mother liquor with the content of isocinchomeronic acid being below 0.1 percent.

The nicotinic acid hydronitrate (354.2 gm.) was dissolved in 1100 gm. of water, heated to 60° C., adjusted to a pH value of 3.3 by addition of 2-methyl-5-ethyl pyridine (230 gm.) and was heated to 90° C. After cooling, the precipitated nicotinic acid was centrifuged off and dried.

The yield was 188 gm. of nicotinic acid with a conversion of 95 percent based on the 2-methyl-5-ethyl pyridine corresponding to an isolated yield of 66.9 percent. The total yield (isolated nicotinic acid plus nicotinic acid in the mother liquor) amounted to 94.5 percent. The two mother liquors were combined and still contained 77.8 gm. of nicotinic acid and 244.81 gm. of 2-methyl-5-ethyl pyridine. These mother liquors were adjusted to the starting concentration by additions of 2-methyl-5-ethyl pyridine and nitric acid.

The solution at the starting concentration, was converted and worked up as described previously. This process produced 250 gm. of nicotonic acid, corresponding to the isolated yield of 88.9 percent at a conversion of 95 percent. The nicotonic acid obtained was pure white and the purity was 99.6 percent.

EXAMPLE 3

The mother liquor of a previous deposit, containing 77.0 gm. of nicotinic acid, 236.7 gm. of 2-methyl-5-ethyl pyridine and 120 gm. of HNO₃ (100 percent), was adjusted to a weight of 4432 gm. and a concentration of 4.68 percent 2-methyl-5-ethyl pyridine and 19.5 percent HNO₃ (corresponding to an excess of 32 percent) by the addition of 2-methyl-5-ethyl pyridine and nitric acid. This solution was used as the starting mixture and was conducted through a 1.6 liter titanium reactor tube (length, about 16 m.) at 234° C. and 52 atm. with a retention time of 8.7 minutes. The reacted mixture was treated according to the procedure of Example 2. The conversion was 97.3 percent and 166 gm. of nicotinic acid resulted which corresponded to an isolated yield of 82.0 percent. The mother liquors were again combined and returned to the process.

EXAMPLE 4

4500 gm. of a mixture of 5.18 percent of β-picoline and 35 percent of nitric acid (corresponding to an excess of 400 percent beyond the theoretical quantity) were raised through a 1.6 liter titanium reactor tube at a temperature of 260° C. and 50 atm., with a retention time of 3.75 minutes.

4115 gm. of a liquid reactor product resulted. The remainder, 385 gm. (8.6 percent), was conducted off in the form of a gas. The liquid reaction product was adjusted to a nitric acid concentration of 25 percent and was cooled to 5° C. This precipitated 213.4 gm. of nicotinic acid hydronitrate with a nicotinic acid content of 66.3 percent and was separated from the acid mother liquor (950 gm.) by centrifuging. There were additional 47.5 gm. of nicotinic acid contained in the mother liquor.

The nicotinic acid hydronitrate (213.4 gm.) was dissolved in 710 gm. of water, heated to 60° C., adjusted to a pH value of 3.4 with β-picoline (107 gm.) and heated to 95° C.

After cooling the nicotinic acid was centrifuged off and dried. 113.0 gm. of nicotinic acid were obtained at a conversion of 68.8 percent based on the β-picoline used. This corresponds to an isolated yield of 60.4 percent and a total yield (isolated nicotinic acid plus nicotinic acid in the mother liquor) of 89.0 percent.

The acid and the base containing mother liquors were combined and contained 47.5 gm. of nicotinic acid and 180 gm. of β-picoline. These combined mother liquors were adjusted to the starting concentration and volume with β-picoline and HNO₃. This solution was recycled through the reactor tube to produce 151.8 gm. of nicotinic acid, corresponding to an isolated yield of 80.5 percent, based on a conversion of 68.6 percent. The nicotinic acid obtained was pure white having a purity of 99.7 percent.

EXAMPLE 5

4720 gm. (4000 ml.) of a mixture of 6.4 percent of 2-methyl-5-ethyl pyridine and 33 percent of HNO₃ were passed through a 30.5 ml. titanium reaction tube during a period of 12 seconds at 330° C., and 280 atm. The liquid reaction product weighed 4090 gm. The remainder, 630 gm. (13.3 percent) was removed as gas.

The reaction product was reduced by evaporation to a nitric acid concentration of 25 percent and cooled in 0° C. This precipitated as crystals, 394.7 gm. of nicotinic acid hydronitrate with a nicotinic acid content of 66.3 percent. This product was separated by centrifuging from the acid mother liquor (870 gm.). The mother liquor contained an additional 30 gm. of nicotinic acid. The content of isocinchomeronic acid in the mother liquor was 0.25 percent.

The nicotinic acid hydronitrate (394.7 gm.) was dissolved in 1200 gm. of water, heated to 95° C. and adjusted to a pH value of 3.3 with 287.0 gm. of 2-methyl-5-ethyl pyridine.

After cooling, the liberated crystallized nicotinic acid was centrifuged off and dried. 204 gm. of nicotinic acid were obtained at a conversion of 95 percent based on the 2-methyl-5-ethyl pyridine. This corresponds to an isolated yield of 70.0 percent with a total yield (isolated nicotinic acid plus nicotinic acid in the mother liquor) of 95.0 percent. The two combined mother liquors still contained 73 gm. of nicotinic acid and 302.0 gm. of 2-methyl-5-ethyl pyridine.

These combined mother liquors were again adjusted to the starting concentrations and quantity by nitric acid and recycled through the process. There resulted 248.0 gm. of nicotinic acid, corresponding to an isolated yield of 84.0 percent at a conversion of 95.0 percent. The nicotinic acid obtained was pure white and had a purity of 99.6 percent.

EXAMPLE 6

Example 1 was repeated, except that the quinoline was oxidized with the nitric acid at a temperature of 200° C. Quinolinic acid of a very high purity was recovered.

EXAMPLE 7

Example 1 was repeated, except that the quinoline was replaced with isoquinoline. Nicotinic acid of a very high purity was recovered.

EXAMPLE 8

Example 7 was repeated, except that the isoquinoline was oxidized with the nitric acid at a temperature of 215° C. Cinchomeronic acid of a very high purity was recovered.

EXAMPLE 9

Example 1 was repeated, except that the quinoline was replaced with lepidine. Nicotinic acid of a very high purity was recovered.

EXAMPLE 10

Example 9 was repeated, except that the lepidine was oxidized with the nitric acid at a temperature of 210° C. α'-Carbisocinchomeronic acid of a very high purity was recovered.

EXAMPLE 11

Example 1 was repeated, except that the quinoline was replaced with quinaldine. Dinicotinic acid of a very high purity was recovered.

EXAMPLE 12

Example 11 was repeated, except that the quinaldine was oxidized with the nitric acid at a temperature of 210° C. α-Carbodinicotinic acid of a very high purity was recovered.

EXAMPLE 13

Example 1 was repeated, except that the quinoline was replaced with acridine. Dinicotinic acid of a very high purity was recovered.

EXAMPLE 14

Example 13 was repeated except that the acridine was oxidized with the nitric acid at a temperature of 210° C.

2,3,5,6-pyridine tetracarbonic acid of a very high purity was obtained.

EXAMPLE 15

Example 1 was repeated, except that the quinoline was replaced with 2-hydroxyquinoline.

EXAMPLE 16

Example 1 was repeated, except that the quinoline was replaced with 8-hydroxyquinoline.

EXAMPLE 17

Example 1 was repeated, except that the quinoline was replaced with 8-hydroxyquinoline.

We claim:

1. A process for the production of carboxylic acid derivatives of pyridine which comprises oxidizing a compound having a fused-ring pyridine nucleus with nitric acid, said nitric acid being present in an amount between 25 and 600 percent in excess of the theoretical quantity, at 180° to 370° C. under 20 to 500 atm. of pressure for at least 2 seconds, precipitating the oxidation product as a hydronitrate, forming an aqueous solution by dissolving the hydronitrate in water and recovering the carboxylic acid derivative of pyridine from the aqueous solution.

2. A process according to claim 1 wherein said compound is selected from the class consisting of quinoline, isoquinoline, lepidine, hydroxyquinoline, aminoquinoline, quinaldine and acridine.

3. A process according to claim 1 wherein said compound contains at least one alkyl group having between one and 20 carbon atoms.

4. A process according to claim 3 wherein said compound has more than one alkyl group and each of said alkyl groups have 1 to 4 carbon atoms.

5. A process according to claim 4 wherein the excess nitric acid is present in an amount from about 30 to about 400 percent more than the theoretical amount required.

6. A process according to claim 5 wherein the temperature of oxidation is from about 230° to about 350° C., and the pressure is from about 50 to 300 atm.

7. A process according to claim 4 wherein the carboxylic acid derivative of pyridine is separated by adjusting the pH of the aqueous solution to the isoelectric point of carboxylic acid derivative of pyridine with said compound to effect precipitation.

8. A process according to claim 2 wherein the excess nitric acid is present in an amount from about 30 to about 400 percent of the theoretical amount required.

9. A process according to claim 8 wherein the hydronitrate is precipitated at about 0° to about 20° C. by adjusting the nitric acid concentration of the reacted mixture to about 10 to about 28 percent.

10. A process according to claim 2 wherein the temperature of oxidation is from about 230° to about 350° C., and the pressure is from about 50 to about 300 atm.

11. A process according to claim 1 wherein the carboxylic acid derivative of pyridine is separated by adjusting the pH of the aqueous solution to the isoelectric point of carboxylic acid derivative of pyridine with said compound to effect precipitation.

12. The process according to claim 11 wherein the mother liquors resulting from the precipitation steps are combined, adjusted to substantially the same concentration as the oxidation mixture and are recycled through the process as starting material.

13. A process according to claim 1 wherein the hydronitrate is precipitated at about 0° to about 20° C. by adjusting the nitric acid concentration of the reacted mixture substantially to the point of minimum solubility for specific hydronitrate.

14. A process according to claim 13 wherein the temperature during precipitation is about 4° to about 12° C. and the nitric acid concentration of the reacted mixture is adjusted from about 12 to 25 percent.

15. The process according to claim 14 wherein the carboxylic acid derivative of pyridine is separated by adjusting the pH of the aqueous solution to the isoelectric point of carboxylic acid derivative of pyridine with said compound to effect precipitation.

16. A process according to claim 15 wherein the aqueous solution is heated prior to the separation step.

17. A process according to claim 15 wherein the mother liquors resulting from the precipitation steps are combined, adjusted to substantially the same concentration as the oxidation mixture and are recycled through the process as starting material.

18. A process according to claim 1 wherein said compound is quinoline.

19. A process according to claim 1 wherein said compound is isoquinoline.

20. A process according to claim 1 wherein said compound is lepidine.

21. A process according to claim 1 wherein said compound is quinaldine.

22. A process according to claim 1 wherein said compound is acridine.

References Cited

UNITED STATES PATENTS 3,657,259  4/1972  Stocker et al. _____ 260—295

OTHER REFERENCES

Elderfield, Heterocyclic Compounds, vol. 1, Wiley, copyright 1950, pp. 565–7.

ALAN L. ROTMAN, Primary Examiner

U.S. Cl. X.R.

260—295.5 R